United States Patent [19]

Douthitt et al.

[11] 4,311,395
[45] Jan. 19, 1982

[54] PIVOTING SKID BLENDER TRAILER

[75] Inventors: John L. Douthitt; Gail F. Davis, both of Duncan, Okla.

[73] Assignee: Halliburton Company, Duncan, Okla.

[21] Appl. No.: 51,602

[22] Filed: Jun. 25, 1979

[51] Int. Cl.³ .............................. B28C 7/02; B28C 7/14
[52] U.S. Cl. .......................................... 366/27; 366/30; 366/66
[58] Field of Search ..................... 366/27, 30, 33, 34, 366/1, 42, 66; 417/900; 280/789

[56] References Cited

U.S. PATENT DOCUMENTS

| 3,112,099 | 11/1963 | Heise | 366/1 |
| 3,608,968 | 9/1971 | Burnett | 417/900 |
| 3,881,706 | 5/1975 | Mohrmann | 366/30 |
| 4,102,613 | 7/1978 | Vukich | 417/900 |
| 4,185,923 | 1/1980 | Bouette | 366/66 |

Primary Examiner—Edward J. McCarthy
Attorney, Agent, or Firm—John H. Tregoning; James R. Duzan

[57] ABSTRACT

A unique chassis arrangement for the mounting of equipment thereon and a unique equipment arrangement for a ground fed type blender means which is trailer mounted for use in well servicing operations.

32 Claims, 5 Drawing Figures

PIVOTING SKID BLENDER TRAILER

This invention relates to a unique chassis arrangement for a land vehicle. More specifically, to a unique chassis arrangement and equipment arrangement for a trailer type ground fed blender for use in well servicing operations.

One common way to increase the production of a well, such as an oil, gas, geothermal, etc. type well, is to fracture the producing zone of the geological formation to allow the formation fluids to flow more freely through the formation into the well. The producing zones of geological formations are usually fractured by pumping fluids into the formation under high pressures. However, if merely a fluid is pumped into the formation during the fracturing operation, upon cessation of the pumping of the fracturing fluid, the naturally occurring geological formation pressures will cause the fractured areas of the formation to close thereby restricting the flow of the formation fluids.

To prevent the geological formation from closing after the fracturing thereof, propping agents, such as sand, walnut shells, glass beads, sintered metals, etc., are forced into the fissures in the formation. Accordingly, the function of a blender is to accurately mix the particulate propping agents and additive materials with the fracturing fluid before the injection of the fracturing fluid into the well.

In the past, one type of blender has been a blender truck constructed having the blender tub rigidly mounted on the rear of the truck chassis several feet from ground level, having the particulate propping agents supplied to the blender tub by screw type conveyors, having the mixed fracturing fluid removed from the blender tub by a centrifugal or gear pump and having the major components of the blender truck directly driven by the truck engine while the other components of the blender truck are driven hydraulically. A disadvantage results from having all the components being operated by the truck engine in that if it is necessary to slow the blender tub mixing speed, a corresponding drop in hydraulic system pressure and the reaction time of the hydraulic system components occurs thereby making it difficult to accurately control the additive mixing rates in the fracturing fluid. Yet another disadvantage results in the maintenance and repair of the pumps and their associated components due to the inaccessibility of their mounting position and the high frequency of repair of the screw type conveyors due to the erosion thereof by the abrasive materials conveyed thereby.

Typical examples of these prior art blender trucks are shown on page 128 of the Halliburton Services Sales and Service Catalog 1970-71, and page 2942 of the Halliburton Services Sales and Service Catalog Number 38.

Another type of blender has been a blender truck constructed having an articulated frame installed upon the truck chassis with the articulate frame having installed thereon a blender tub which requires no conveying means, independently driven blending and hydraulic systems thereby allowing the independent speed control of each, and an arrangement for equipment which allows access to components requiring frequent repair and allows the addition of a power source to independently drive the various components of the blending system thereby allowing the optimization of horsepower requirements for the blending system, the hydraulic system and truck transportation system. However, the blender is expensive to manufacture since an articulated frame must be installed upon the truck chassis as well as the necessary actuation mechanism and the inclusion of a separate power source for the blending any hydraulic systems.

The above-mentioned blender is disclosed in U.S. Patent Application Ser. No. 879,535, filed Feb. 21, 1978.

While the above-mentioned prior art blenders are capable of handling many blending operations, since each is mounted on a truck chassis, the blenders are expensive to manufacture and have excess capacity for small blending operations for well servicing operations. In contrast to these prior art blenders, the present invention is directed to a unique chassis arrangement for the mounting of the equipment thereon and a unique equipment arrangement for a ground fed type blender means which is trailer mounted for use in well servicing operations.

In elementary terms, the unique chassis arrangement comprises a gooseneck or U-shaped type trailer frame having an articulated framework mounted thereon. Similarly, the unique equipment arrangement for the trailer type ground fed blender comprises a blender tub means which requires no conveying means, a plurality of chemical additive systems, and an arrangement for equipment which allows access to components requiring frequent repair while utilizing a minimum of physical volume.

The foregoing advantages of the present invention will be more fully understood in conjunction with the following drawings and description thereof.

Figure 1:
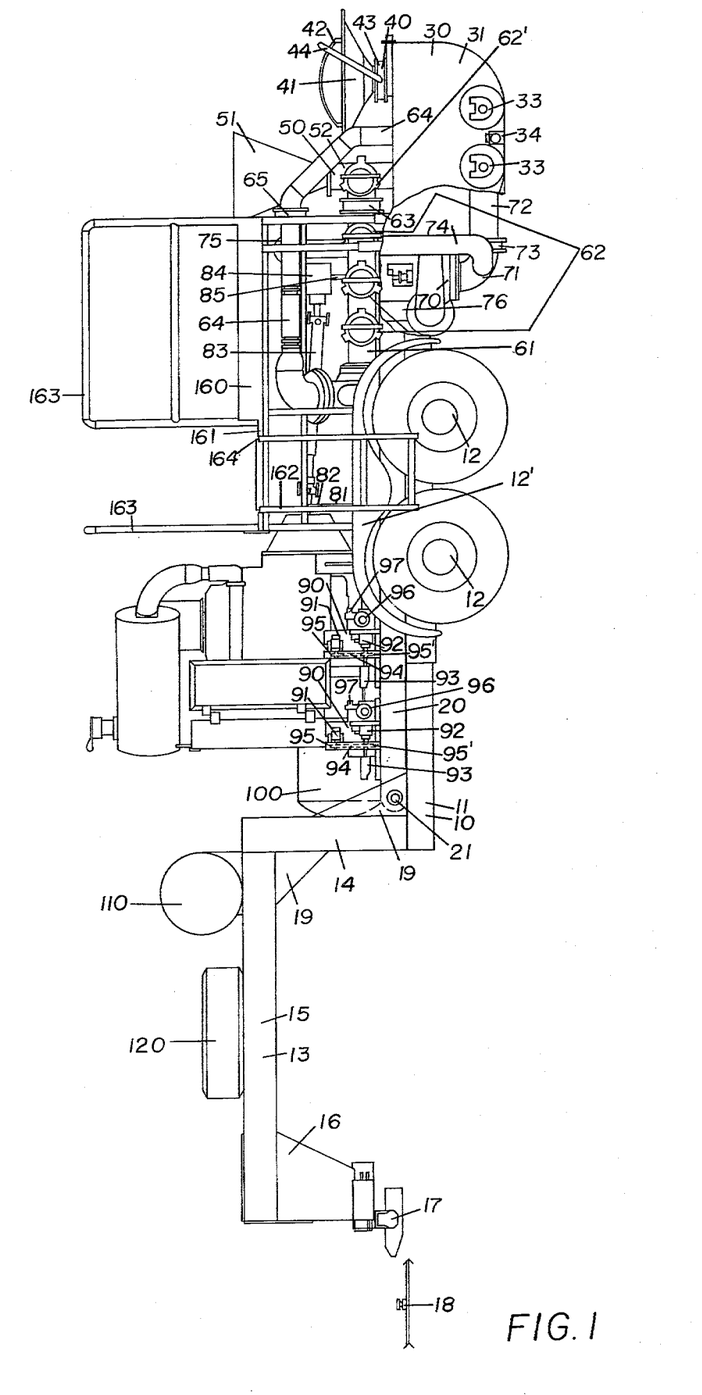
FIG. 1 is a view of the right side of the present invention having a portion of the equipment cut away.

Referring to FIG. 1, the present invention is shown in its preferred embodiment. A trailer chassis 10 is shown having an articulated framework 20 thereon which, in turn, contains the various blender components mounted thereon.

The trailer chassis 10 comprises a load frame portion 11 having suitable axle means and wheel means 12 secured thereto having fender means 12' therearound, U-shaped neck portion 13 having aft vertical member 14, horizontal member 15 and fore vertical member 16 forming the U-shape, and suitable hitch means 17. The trailer chassis 10 may be of any suitable design with the load frame portion 11 having a generally rectangular shape and sufficient axle means and wheel means 12 mounted thereon to carry the desired load while the U-shaped neck portion 13 is formed in a sufficiently large U-shape to allow the trailer 10 to be towed by a light duty truck, such as a pick-up, having the hitch means 18 of the truck, which mates with hitch means 17 of the trailer 10, mounted in the load carrying or bed portion of the truck. The aft vertical members 14 of the U-shaped neck portion 13 has reinforcing members 19 additionally securing the members 14 to the load frame portion 11 and horizontal member 15.

Mounted on the load frame portion 11 of the trailer 10 is articulated framework 20. The articulated framework 20 is secured for rotational movement relative to trailer 10 by pivot means 21 which are installed in reinforcing members 19. The articulated framework 20 is approximately the same physical size as the load frame portion 11 of the trailer 10 to allow ready access to the components mounted on the articulated frame 20.

Figure 4:
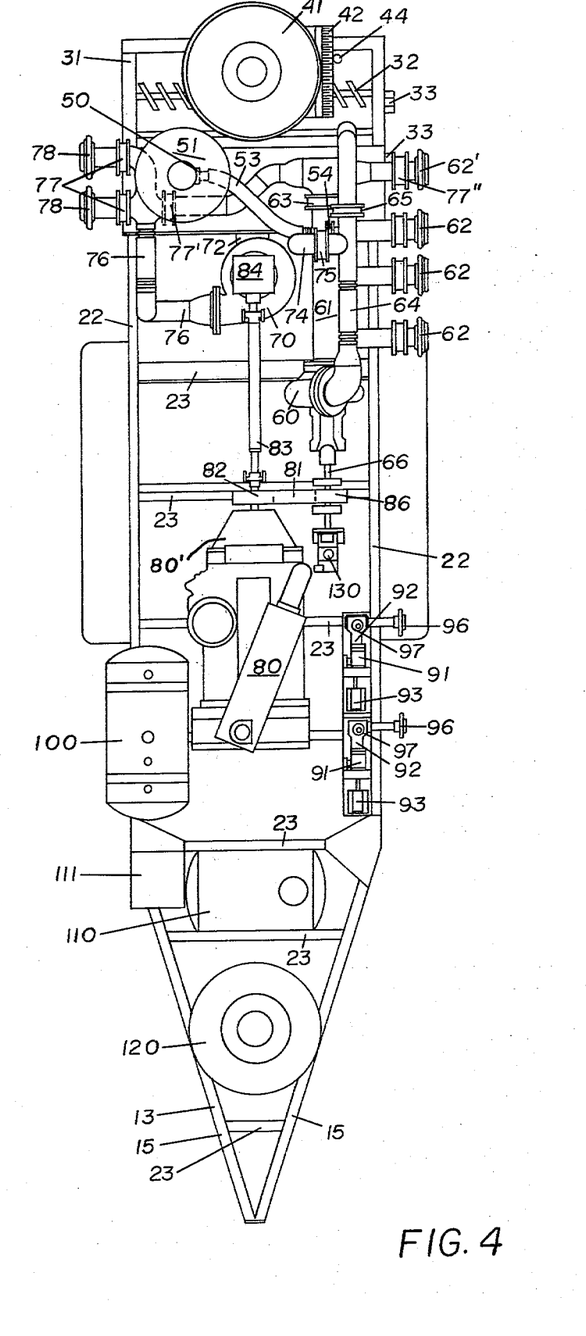
FIG. 4 is a view of the top of the present invention with the operator's stand deleted.

The articulated frame 20 comprises a plurality of longitudinal frame members 22 and a plurality of interconnecting cross-members 23 (shown in FIG. 4). The longitudinal frame members 22 and cross-members 23 may be formed of any suitable materials such as C-shaped or U-shaped structural steel members and may be secured to each other by any suitable means, such as welding, the use of threaded fasteners, etc. Similarly, the trailer chassis 10 may be formed of any suitable materials such as C-shaped or U-shaped structural steel members and may be secured by any suitable means, such as welding, threaded fasteners, etc.

Mounted on the articulated frame 20 is the equipment for the blending of various materials.

A blender mixing means 30 is mounted on the rear of and extending below the articulated frame 20 to provide easy access thereto during blending operations. Any suitable blender mixing means 30 may be employed, however, a six barrel blender mixing means as available from Halliburton Services, a Division of Halliburton Company, Duncan, Okla., is preferred.

As shown, the blender mixing means 30 comprises a blender mixing tub means 31, internal screw type agitators 32 (see FIG. 4) which are driven by suitable hydraulic motor means 33 and internal spray means (not shown) to supply fluid to the interior of the blender mixing tub means 31. The blender mixing means 30 may optionally include a drain valve means 34 at the bottom of the blender mixing tub means 31 to facilitate cleaning of the tub 31 after the use thereof.

The screw type agitators 32 may be driven by any suitable power means, such as electrical, mechanical, hydraulic, etc., however, an individual hydraulic motor 33 driving each agitator is preferred. A preferred type of hydraulic motor for use to drive the screw type agitator is a Spherette model S-125 which is available from North American Hydraulics, Inc., Baton Rouge, LA 70895.

To meter the particulate material into the blender mixing means 30, a calibrated gate valve means 40 is installed on the top of the blender mixing means along the rear surface thereof. The calibrated gate valve means 40 comprises a hopper means 41, indicator means 42, and gate valve means 43 having actuation means 44 connected thereto. Any suitable calibrated gate valve means 40 may be used, however, a calibrated sand valve assembly available from Halliburton Services, a Division of Halliburton Company, Duncan, Okla., is preferred.

To meter dry additive chemical material to be mixed with other ingredients in the blender mixing means 30, dry chemical additive means 50 is installed on the top of the blender mixing means along one side thereof. The dry chemical additive means 50 comprises hopper means 51 and eductor means 52. Alternately, the dry chemical additive means 50 may comprise a vane type feeder proportioner means which is powered by a suitable hydraulic motor means and an eductor means. While any suitable eductor means and hopper means or vane type feeder proportioner means and eductor means can be utilized, it is preferred that the hopper means, eductor means and vane type feeder proportioner means be commercially available units as manufactured by Halliburton Services, a Division of Halliburton Company, Duncan, Okla.

For pumping fluid into the blender mixing means 30 a centrifugal transfer pump means 60 is used. The centrifugal transfer pump means 60 may be any suitable commercially available pump means, although a 6M-RH model 4021H Deming pump available from the Crane Company, Salem, Ohio, is preferred.

Connected to the inlet of the centrifugal transfer pump means 60 is transfer inlet manifold 61 having a plurality of inlets 62 therein having male half unions thereon and valve means 63 installed between the last inlet and the remaining inlets of the transfer inlet manifold 61 so that the last inlet may be isolated from the transfer inlet manifold.

The centrifugal transfer pump means 60 discharges through transfer discharge manifold 64 having valve means 65 therein into the blender mixing means 30 or, alternately, via bypass line 74 into the inlet of centrifugal booster pump means 70.

As can be seen, the centrifugal transfer pump means 60 is mounted on the articulated framework 20 having the inlet of the pump means and the inlet manifold means 61 connected thereto in substantially parallel relationship to the articulated framework 20 and with transfer inlet manifold means 61 extending in the direction of and overlaying a portion of the blender mixing means 30 thereby allowing the pump means drive shaft 83 (see FIG. 4) to extend substantially parallel to the articulated framework 20 in the opposite direction to the inlet manifold means 61.

The centrifugal booster pump means 70 is mounted in a vertical position on the articulated framework 20 in close proximity to the blender mixing means 30 with the booster pump means 70 being located no higher than the top of the blender tub mixing means 31. The inlet to the centrifugal booster pump means 70 is connected to booster inlet manifold means 71 which, in turn, is connected to blender tub pipe 72 having valve means 73 therein and bypass line 74 having valve means 75 therein.

The centrifugal booster pump means 70 discharges through booster discharge manifold 76 having discharge valve means 77 (see FIG. 4) and alternate discharge valve means 77' and 77" (see FIG. 4) connected thereto.

Similar to the centrifugal transfer pump means 60, the centrifugal booster pump means 70 may be any suitable commercially available pump means, although a 6M-RH Model 4021H Deming pump available from the Crane Company, Salem, Ohio, is preferred.

Suitable engine means 80 is installed on the articulated framework 20 to supply motive power to the centrifugal transfer pump means 60 and centrifugal booster pump means 70 as well as other components.

The centrifugal transfer pump means 60 is driven from the power take-off 80' of the engine means 80 via belt means 81 and pulley means 82 installed on the power take-off shaft of the engine means 80 which, in turn, drives pulley means 86 connected to the drive shaft 66 (see FIG. 4) of the centrifugal transfer pump means 60 while centrifugal booster pump means 70 is driven via drive shaft means 83 and right angle gear box means 84 having the output shaft 85 thereof coupled to the drive shaft of the centrifugal booster pump means (not shown).

The engine means 80 can be any suitable engine means capable of supplying the necessary power and having a power take-off installed thereon, however, a 3-71 or 4-71 Series engine and power take-off available from Detroit Diesel-Allison Division of General Motors Corporation, Detroit, Mich., is preferred.

The right angle gear box means 84 may be any suitable gear box means, although a Series 66, Style E, Number 02-20-03514-066, 1:1 5P-RT Angle gear box available from Hub City of Aberdeen, S. Dak., preferred.

Mounted in close proximity to front of the articulated framework 20 along one side thereof are liquid chemical additive supply means 90. The liquid chemical additive supply means 90 comprises hydraulic motor means 91, hydraulic pump means 92 and electrical generator means 93. The hydraulic motor means 91 drives hydraulic pump means 92 and electrical generator means 93 via chain means 94 and sprocket drive means 95 and 95'. The lower sprocket drive means 95' is connected to both the drive shaft of the hydraulic pump means 92 and the electrical generator means 93. Although a chain means 94 and sprocket drive means 95 and 95' is preferably used to drive the hydraulic pump means 92 and electrical generator means 93, any suitable drive means may be used, such as belt, gear, etc.

The hydraulic pump means 92 of the liquid chemical additive supply means 90 has an inlet 96 and one or more outlets 97 thereon. Depending upon the liquid chemicals to be injected and mixed, the outlets 97 from the hydraulic pump means 92 may be connected either to the blender tub means 31, or the inlets to the centrifugal transfer pump means 60 or centrifugal booster pump means 70, or the outlets of the centrifugal transfer pump means 60 or centrifugal booster pump means 70. For clarity, none of the outlet lines from the outlets 97 of the hydraulic pump means 92 have been shown.

The hydraulic motor means 91 may be of any suitable type, although a model 101-1019-007 hydraulic motor available from Char Lynn of Eden Prairie, Minn., is preferred.

The hydraulic pump means 92 may be of any suitable type, although a model 151, 1½ inch pump available from Viking Pump, a Division of Houdaille Industries, Inc. of Cedar Falls, Iowa, is preferred.

The electrical generator means 93 may be of any suitable type, although a model SU-780D-1 tac-generator available from Servo-Tek Products Company of Hawthorn, N.J., is preferred.

The volume output of the liquid chemical additive system may be determined by connecting the generator means 93 to a suitably calibrated electrical meter which converts the output from the generator into a direct reading of volume flow rate. In this manner the volume flow rate of chemical being added to the materials being blended in blender tub means 31 can be accurately determined during blending operations.

Installed on the opposite side of the articulated framework 20 with respect to the liquid additive supply means 90 is a fuel tank means 100. The fuel tank means 100 may be of any suitable type to supply and contain fuel to supply the engine means 80.

Installed on horizontal members 15 of the U-shaped neck portion 13 of the trailer chassis 10 is hydraulic fluid supply tank means 110 for supplying hydraulic fluid to the hydraulic motor means 91, hydraulic cylinders 150 (see FIG. 5), and hydraulic pump means 130 (see FIG. 4), and spare wheel and tire means 120. The hydraulic fluid supply tank means 110 may be of any suitable type while the spare wheel and tire means 120 is of the same size as the wheel and tire means installed on axle and wheel means 12 of the trailer chassis 10. By installing the hydraulic fluid supply tank means 110 on the horizontal members 15 of the U-shaped neck portion 13, the weight of the various components on the trailer chassis may be more easily balanced to ensure easy towing of the trailer chassis 10.

Further installed on the articulated framework 20 is an operator's stand 160 which provides a working area above the various components installed on the framework 20. The operator's stand 160 is formed of suitable structural materials and comprises a floor means 161, retractable stair means 162 and guard rail means 163. To retract the stair means 162, the stair means 162 pivots about hinge means 164 to overlay floor means 161.

Figure 2:
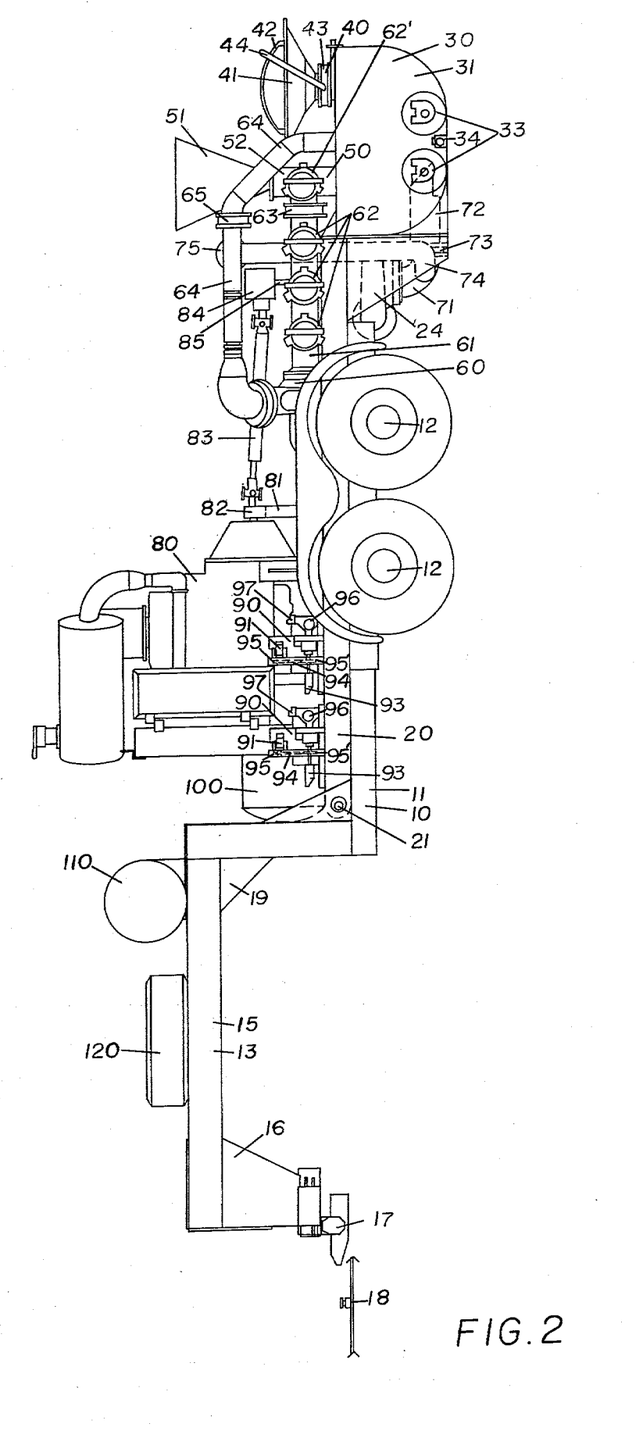
FIG. 2 is a view of the right side of the present invention with the operator's stand deleted.

Referring to FIG. 2, the present invention is shown in its preferred embodiment with the operator's stand removed and with the hydraulic cylinder 150 removed which are used to raise and lower the articulated framework 20. As shown, the blender tub means 31 typically has reinforcing plate means 24 on either side of the articulated framework 20 to reinforce the attachment of the blender tub means 31 to the articulated framework 20.

Figure 3:
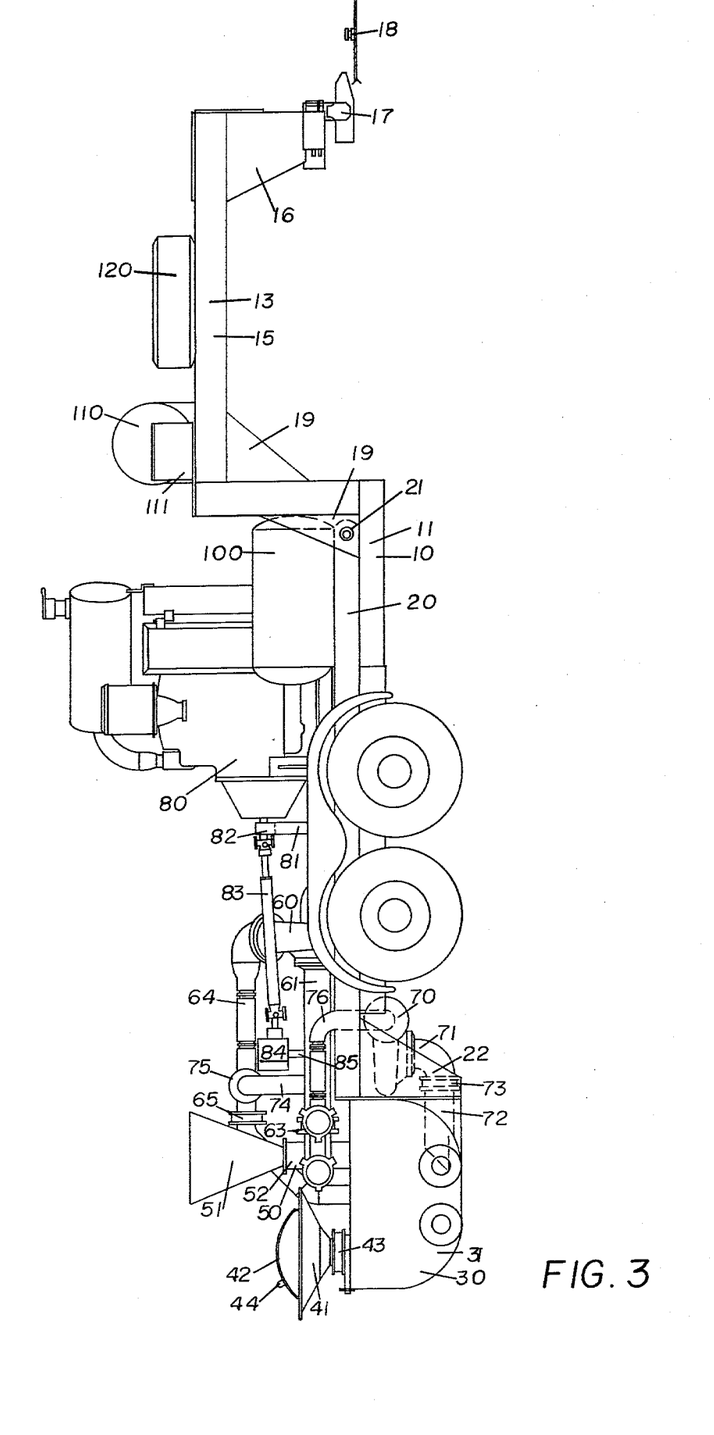
FIG. 3 is a view of the left side of the present invention with the operator's stand deleted.

Referring to FIG. 3, the present invention is shown from the left side with the operator's stand 160 and hydraulic cylinders 150 removed for clarity. The bypass line 74 can be seen which can allow the blender tub means 31 to be bypassed and the discharge of centrifugal transfer pump means 60 to be directly pumped into the booster inlet manifold 71 of the centrifugal booster pump means 70.

A battery storage means 111 is shown installed on the U-shaped portion 13 of the trailer chassis 10 adjacent to the hydraulic fluid supply tank means 110. The battery storage means may be of any desired shape, constructed in any desired geometric shape and fabricated of any desired material.

Referring to FIG. 4, the present invention is shown in its preferred embodiment in a top view without the operator's stand 130 and hydraulic cylinders 150.

As can be seen in FIG. 4, the transfer discharge manifold 64 of centrifugal transfer pump means 60 includes a valve means 54 connected thereto and controlling the flow through line 53 to the eductor means 52. Also shown, is valve means 75 connected to transfer discharge manifold 64 of centrifugal transfer pump means 60 controlling flow to bypass line 74 which connects with booster inlet manifold 71 to centrifugal booster pump means 70.

As shown, hydraulic pump means 130 is commonly driven from pulley means 86 which is connected to drive shaft 66 of centrifugal transfer pump means 60. Hydraulic pump means 130 comprises any suitable hydraulic pump means which is capable of supplying the necessary hydraulic fluid flow to power the hydraulic motors 33 driving the screw type agitators 32 in the blender tub means 31, the hydraulic motors 91 driving the liquid additive hydraulic pump means 92 and the hydraulic cylinders 150 which raise and lower the rear of the articulated framework 20 (see FIG. 5). The fluid lines and their associated control valves connecting the hydraulic pump means 130 to the hydraulic fluid supply tank means 100 and to the hydraulic motors 33, hydraulic motors 91 and the hydraulic cylinders 150 have been deleted for clarity.

Although any suitable pump means may be used, a model 130 Vickers pump available from Sperry Vickers of Troy, Mich., is preferred.

Figure 5:
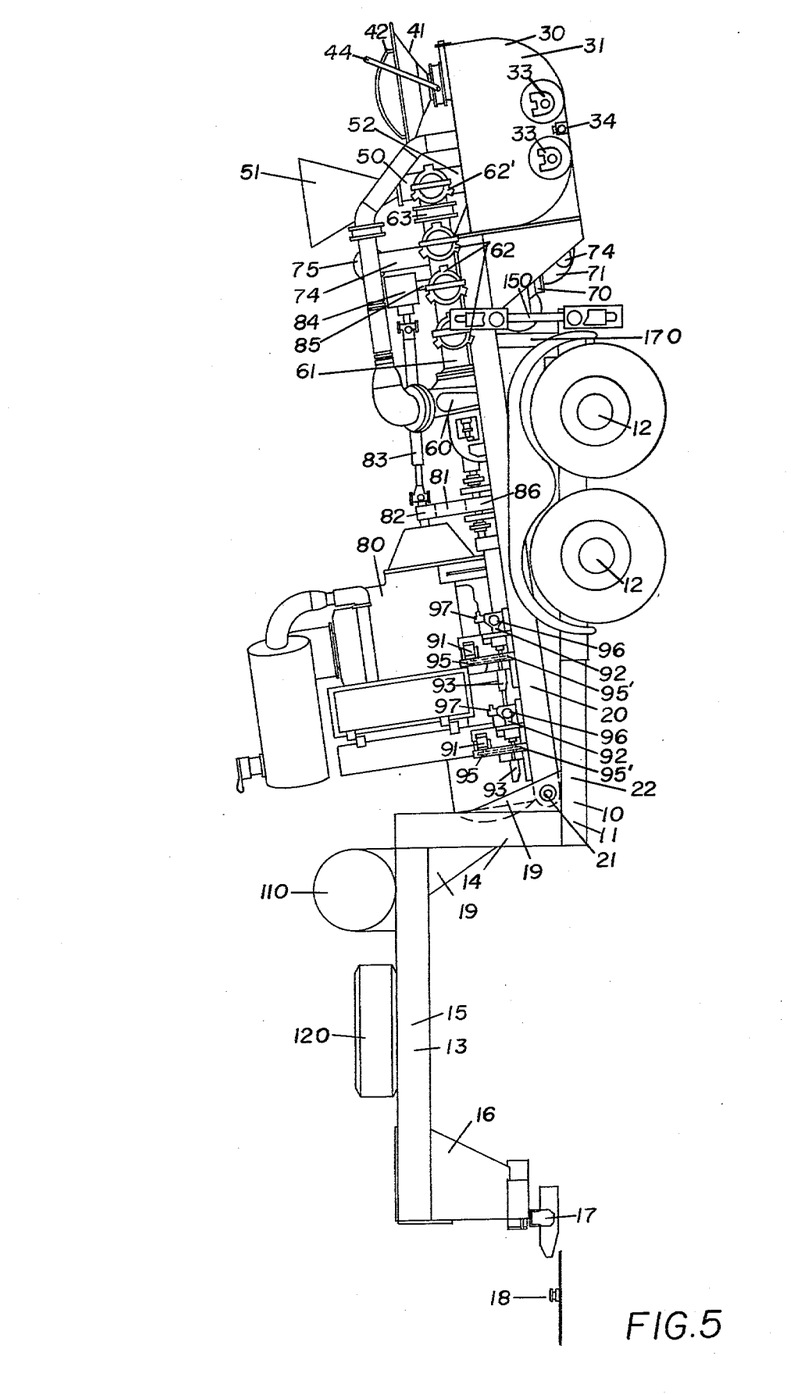
FIG. 5 is a view of the right side of the present invention with the operator's stand deleted and having the invention in a road transport position.

Referring to FIG. 5, the present invention is shown in its preferred embodiment without the operator's stand and in its transport position. To facilitate the transport of the ground fed blender the articulated framework 20 is pivoted about pivot means 21 by means of hydraulic cylinders 150 installed between the longitudinal frame members 22 of the load frame portion 11 of the trailer chassis 10 and the articulated framework 20. When the hydraulic cylinders 150 are actuated the articulated framework 20 pivots about pivot means 21 thereby allowing the blender tub means to be raised and disengage the surface upon which it has been resting during blending operations. Once the hydraulic cylinders 150 have been fully extended, suitable locking means 170, such as a bar linkage and pin means, are inserted between the longitudinal frame members 22 and articulated framework 20 to secure the articulated framework 20 in its transport position thereby preventing the lowering of the articulated framework should the hydraulic fluid pressure to the hydraulic cylinders 150 lessen.

Any suitable hydraulic cylinder means 150 may be utilized to raise and lower the articulated framework 20 for transport operations. Alternately, any suitable mechanical means capable of pivoting the articulated framework 20 about pivot means 21 while raising the rear of the framework 20 until the rear of framework 20 can be secured in position by locking means 160 can be utilized.

Referring briefly to FIGS. 1 through 5, the various operations of the present invention will be discussed.

As shown in FIG. 1, the present invention is in an operative position to begin any blending operation. The inlet manifold 61 having a plurality of inlets 62 thereon is connected to a supply source for the fluid to be used in the blending operation. In order to utilize all the inlets 62 on the inlet manifold 61, valve means 63 must be in an open position and valve means 77' (see FIG. 4) must be closed thereby blocking fluid flow to booster discharge manifold 76 of the centrifugal booster pump means 70. To direct the fluid flow from the transfer discharge manifold 64 of the centrifugal transfer pump means 60 into the blender tub means 31, valve means 65 in the transfer discharge manifold 64 is opened and valve means 75 in bypass line 74 to the centrifugal booster pump means 70 is closed. In order to use the dry chemical additive means 50 to inject dry chemical additives into the blender tub means 31 fluid must be supplied from the transfer discharge manifold 64 of the centrifugal transfer pump means 60 to the eductor means 52 of the dry chemical additive means 50. To supply fluid from the transfer discharge manifold 64 to the eductor means 52 valve means 54 is opened thereby allowing fluid flow from transfer discharge manifold 64 through line 53 into eductor means 52. The rate of flow to eductor means 52 may be controlled by valve means 54.

To remove blended fluids from the blender tub means 31, booster inlet manifold means 71 of centrifugal booster pump means 70 is connected to blender tub pipe 72 by having valve means 73 therein in an open position. The blender fluids are discharged from booster discharge manifold 76 having valve means 77 therein in an open position through the female half unions 78. When discharging blended fluids from female half unions 78, valve means 77' must be in a closed position to prevent flow into transfer inlet manifold 61. Alternately, the flow of blended fluids may be diverted to male union half 62' on the transfer inlet manifold 61 by closing valve means 63, closing valve means 77, and opening valve means 77'. Also alternately, blended fluid flow may be directed through female union halves 78 and male union half 62' by closing valve means 63 and opening valve means 77 and 77'.

To bypass the flow of fluid being pumped by centrifugal transfer pump means 60 around the blender means 30 and directly into centrifugal booster pump means 70, valve means 65 is closed, valve 73 is closed and valve means 75 is opened.

It should be apparent from the foregoing description and drawings that several advantages result from the arrangement of the various blender components with respect to the articulated framework 20 and trailer chassis 10.

One advantage results when the articulated framework 20 is in its normal operating position having the blender mixing means 30 resting on the same surface as wheel means 12 and the centrifugal transfer pump means 60 and centrifugal booster pump means 70 mounted in close proximity to each other. By mounting the centrifugal booster pump means 70 in close proximity to the blender mixing means 30 and the centrifugal transfer pump 60 the booster pump means 70 is kept almost completely flooded with liquid during its operation thereby helping to prevent any loss of prime of the pump during normal pumping operation.

Another advantage results from the mounting of the centrifugal transfer pump means 60 and centrifugal booster pump means 70 in relatively accessible areas of the blender trailer 10 the pumps are easily accessible for repair and servicing.

Yet another advantage results from having the blender tub means 31 mounted such that it may be fed with materials via gate valve means 40 from normal commercially available land vehicles thereby eliminating the need for screw-type conveyors to convey the materials to the blender tub means 31.

Still yet another advantage results from having the various components on the articulated framework 20 within the general peripheral boundaries of the articulated framework 20 and blender means 30 with the articulated framework 20 overlaying the load frame portion 11 of the trailer chassis 10 thereby allowing ready access to the components. For instance, the liquid additive supply means 90 is readily accessible for the easy connection of fluid flow lines thereto, easy repair of the components thereof, etc. Similarly, the hydraulic fluid supply tank means 110, fuel tank means 100, blender means 30, transfer inlet manifold means 61, booster discharge manifold means 76, dry additive means 50 and calibrated gate valve means 40 are all readily accessible from the periphery of the trailer chassis 10 from ground level. In contrast, a conventional flat bed trailer chassis having the bed extending above and beyond the wheel means thereon would have the components mounted thereon in much higher positions and inwardly of the periphery of the bed thereby making the use and servicing of the components awkward.

A further advantage results from the installation of the components on a trailer chassis 10 which is capable of being towed by a light duty truck, such as a pick-up, the expense of mounting the components on a selfpropelled vehicle chassis, such as a light duty truck, is avoided and the blender can be economically constructed.

Another advantage results when the blender is constructed from the preferred components in that the blending capacity of the unit, approximately 25 barrels per minute, where a barrel is defined as 42 gallons, is of sufficient size to be conveniently used in a wide variety of blending operations.

Yet another advantage results from the blender being constructed having a bypass line to bypass fluid around the blender means from the centrifugal transfer pump means directly to the centrifugal booster pump means thereby allowing the blender to be used as a pumping unit only.

Another further advantage results from constructing the blender from readily available structural materials for the trailer frame and articulated framework and by utilizing commercially available components thereon thereby permitting the blender to be easily constructed in any convenient location.

It should also be understood that since the operation and control of blenders and their various components used to mix the various dry, particulate, and liquid materials used in well servicing operations is well known in the art, the specific operation of each component of the blender and its interrelationship with the other components described hereinbefore is well known and understood by those of ordinary skill in the art and, accordingly, has not been described in detail.

It should be further understood that the trailer chassis 10 and the articulated framework 20 thereon could be used for a wide variety of purposes other than the mounting of components for blending operations in well servicing operations. The trailer chassis 10 and articulated framework 20 thereon could be used to mount any components thereon where it is desirable to have easy access to certain components during the operation thereof.

It must also be understood that while the present invention has been described in reference to blending the various chemicals used in fracturing type well servicing operations, the blender could be used in a wide type of well servicing operations to blend various chemicals and fluids such as acidizing operations, diverting operations, hydrojetting operations, pregelling operations, supplying fluid under pressurized conditions, etc.

While the invention has been described with reference to preferred embodiments, it will be appreciated by those skilled in the art that additions, deletions, modifications and substitutions, or other changes not specifically described herein may be made which fall within the purview of the appended claims.

What is claimed is:

1. A trailer type land vehicle comprising:
 a chassis including a load frame portion having axle means and wheel means secured thereto and a U-shaped neck portion secured to the load frame portion; and
 an articulated framework pivotally secured about one end of the load frame portion of said chassis, said articulated framework comprising:
  a structure substantially the same shape as the load frame portion of said chassis and pivotally secured to the load frame portion at the juncture of the load frame portion and the U-shaped neck portion.

2. The trailer type land vehicle of claim 1 further comprising:
 lifting means having one end thereof secured to the other end of the load frame while the other end of the lifting means is secured to the articulated framework whereby the articulated framework may be pivoted with respect to the load frame portion of said chassis upon actuation of the lifting means.

3. The trailer type land vehicle of claim 1 wherein the load frame portion of said chassis and the articulated framework are substantially rectangular in shape.

4. The trailer type land vehicle of claim 1 wherein the wheel means secured to the load frame portion of said chassis are located outboard of the load frame portion.

5. A trailer type land vehicle comprising:
 a chassis including a rectangular load frame portion having axle means and wheel means secured thereto, the wheel means located outboard of the load frame portion, and a U-shaped neck portion secured to the load frame portion;
 a substantially rectangular articulated framework pivotally secured about one end of the load frame portion of said chassis, said articulated framework comprising:
  a substantially rectangular structure the same shape as the load frame portion of said chassis and pivotally secured to the load frame portion at the juncture of the load frame portion and the U-shaped neck portion; and
 lifting means having one end thereof secured to the other end of the load frame while the other end of the lifting means is secured to the articulated framework whereby the articulated framework may be pivoted with respect to the load frame portion of said chassis upon actuation of the lifting means.

6. A trailer type land vehicle for use as a blender for the mixing of dry, particulate and liquid materials comprising:
 a chassis including a load frame portion having axle means and wheel means secured thereto and a U-shaped neck portion secured to the load frame portion;
 an articulated framework pivotally secured about one end of the load frame portion of said chassis, said articulated framework comprising:
  a structure substantially the same shape as the load frame portion of said chassis and pivotally secured to the load frame portion at the juncture of the load frame portion and the U-shaped neck portion;
  engine means mounted on the articulated framework;
  blender means mounted on the other end of the articulated framework;
  transfer pump means mounted on the articulated framework; and
  booster pump means mounted on the articulated framework.

7. The trailer type land vehicle of claim 6 further comprising:
 dry additive means to meter said dry materials into the blender means during mixing operations.

8. The trailer type land vehicle of claim 6 further comprising:
 liquid additive means to meter a portion of said liquid materials during mixing operations.

9. The trailer type land vehicle of claim 6 further comprising:
hydraulic pump means located on the articulated framework to supply hydraulic fluid under pressure; and
fuel tank means located on the articulated framework to contain fuel for the engine means.

10. The trailer type land vehicle of claim 6 further comprising:
lifting means having one end thereof secured to the other end of the load frame while the other end of the lifting means is secured to the articulated framework whereby the articulated framework may be pivoted with respect to the load frame portion of said chassis upon actuation of the lifting means.

11. The trailer type land vehicle of claim 6 further comprising:
hydraulic fluid supply tank means located on the U-shaped neck portion of said chassis to supply hydraulic fluid to the hydraulic means during the operation thereof.

12. The trailer type land vehicle of claim 6 wherein the transfer pump means comprise centrifugal pump means.

13. The trailer type land vehicle of claim 6 wherein the booster pump means comprise centrifugal pump means.

14. A trailer type land vehicle for use as a blender for the mixing of dry, particulate and liquid materials comprising:
a chassis including a load frame portion having axle means and wheel means secured thereto and a U-shaped neck portion secured to the load frame portion;
an articulated framework pivotally secured about one end of the load frame portion of said chassis, said articulated framework comprising:
a structure substantially the same shape as the load frame portion of said chassis and pivotally secured to the load frame portion at the juncture of the load frame portion and the U-shaped neck portion;
lifting means having one end thereof secured to the other end of the load frame while the other end of the lifting means is secured to the articulated framework whereby the articulated framework may be pivoted with respect to the load frame portion of said chassis upon actuation of the lifting means;
engine means mounted on the articulated framework;
blender means mounted on the other end of the articulated framework;
transfer pump means mounted on the articulated framework;
booster pump means mounted on the articulated framework;
dry additive means to meter said dry materials into the blender means during mixing operations;
liquid additive means mounted on the articulated framework to meter a portion of said liquid materials during mixing operations;
hydraulic pump means located on the articulated framework to supply hydraulic fluid under pressure;
fuel tank means located on the articulated framework to contain fuel for the engine means;
hydraulic fluid supply tank means located on the U-shaped neck portion of the chassis to supply hydraulic fluid to the hydraulic pump means during the operation thereof; and
bypass means for selectively bypassing said liquid materials around the blender means to directly pump said liquid materials from the transfer pump means to the booster pump means.

15. The trailer type land vehicle of claim 14 further comprising operator stand means located on the articulated framework for providing a working area during the operation of said trailer type land vehicle.

16. The trailer type land vehicle of claim 14 wherein the engine means is mounted on the end portion of the articulated framework pivotally secured to the load frame portion of said chassis and in substantially the center thereof.

17. The trailer type land vehicle of claim 14 wherein the transfer pump means is mounted on the other end of the articulated framework forward of the blender means, along one side of the articulated framework and having the inlet manifold means thereto extending substantially parallel to the side of the articulated framework.

18. The trailer type land vehicle of claim 14 wherein the booster pump means is mounted on the other end of the articulated framework in substantially the center thereof and forward of the blender means.

19. The trailer type land vehicle of claim 14 wherein the liquid additive means is mounted on the end portion of the articulated framework pivotally secured to the load frame portion of said chassis along one side thereof.

20. The trailer type land vehicle of claim 19 wherein the hydraulic tank means is mounted on the end portion of the articulated framework pivotally secured to the load frame portion of the chassis along the side of the articulated framework opposite the side of the articulated framework the liquid additive means is located.

21. The trailer type land vehicle of claim 17 wherein the hydraulic pump means is mounted on the articulated framework on the same side as the transfer pump means.

22. The trailer type land vehicle of claim 14 wherein the dry additive means is mounted above the blender means to meter said dry materials into the blender means.

23. The trailer type land vehicle of claim 14 further comprising particulate metering means to meter said particulate material into the blender means.

24. The trailer type land vehicle of claim 23 wherein the particulate metering means is mounted above the blender means.

25. The trailer type land vehicle of claim 14 wherein the transfer pump means and booster pump means comprise centrifugal pump means.

26. A trailer type land vehicle for use as a blender for the mixing of dry, particulate and liquid materials comprising:
a chassis including a load frame portion having axle means and wheel means secured thereto and a U-shaped neck portion secured to the load frame portion;
an articulated framework pivotally secured about one end of the load frame portion of said chassis, said articulated framework comprising:
a structure substantially the same shape as the load frame portion of said chassis and pivotally secured to the load frame portion at the juncture of the load frame portion and the U-shaped neck portion;

lifting means having one end thereof secured to the other end of the load frame while the other end of the lifting means is secured to the articulated framework whereby the articulated framework may be pivoted with respect to the load frame portion of said chassis upon actuation of the lifting means;

blender means mounted on the other end of the articulated framework for mixing the dry, particulate and liquid materials;

transfer pump means mounted on the other end of the articulated framework forward of the blender means, along one side of the articulated framework and having the inlet manifold means thereto extending substantially parallel to the side of the articulated framework for the transfer of a portion of said liquid materials into the blender means;

booster pump means mounted on the other end of the articulated framework in substantially the center thereof and forward of the blender means for the pumping of said materials from the blender means after being mixed therein;

dry additive means mounted above the blender means to meter said dry materials into the blender means being mixed with said particulate and liquid materials therein;

liquid additive means mounted on the end portion of the articulated framework pivotally secured to the load frame portion of said chassis along one side thereof to supply a portion of said liquids to the blender to be mixed therein with other said liquid materials and said dry and particulate materials;

hydraulic pump means mounted on the articulated framework on the same side as the transfer pump means to supply hydraulic fluid under pressure;

engine means mounted on the end portion of the articulated framework pivotally secured to the load frame portion of said chassis and in substantially the center thereof to supply motive power to the transfer pump means, booster pump means and hydraulic pump means;

fuel tank means located on the end portion of the articulated framework pivotally secured to the load frame portion of the chassis along the side of the articulated framework opposite the side of the articulated framework the liquid additive means is located to supply fuel to engine means;

hydraulic fluid supply tank means located on the U-shaped neck portion of the chassis to supply hydraulic fluid to be pumped by the hydraulic pump means;

bypass means to selectively bypass said liquid materials around the blender means to directly pump said liquid materials from the transfer pump means to the booster pump means;

operator stand means located on the articulated framework to provide a working area during the operation of said trailer type land vehicle; and particulate metering means mounted above the blender means to meter said particulate material into the blender means.

27. The trailer type land vehicle of claim 26 wherein the transfer pump means and booster pump means comprise centrifugal pump means.

28. The trailer type land vehicle of claim 26 wherein the booster pump means discharges simultaneously through manifold means on both sides of the articulated framework means.

29. The trailer type land vehicle of claim 26 wherein the liquid additive means and the lifting means are hydraulically operated by hydraulic fluid under pressure supplied by the hydraulic pump means.

30. The trailer type land vehicle of claim 26 wherein the transfer pump means and the hydraulic pump means are commonly powered by the engine means.

31. The trailer type land vehicle of claim 26 wherein the transfer pump means, booster pump means, and hydraulic pump means are directly driven by the engine means.

32. The trailer type land vehicle of claim 26 wherein the transfer pump means, booster pump means and hydraulic pump means are each powered by hydraulic motor means which are powered by hydraulic pump means powered by the engine means.

* * * * *